Patented Jan. 23, 1940

2,187,723

UNITED STATES PATENT OFFICE 2,187,723

PRIMARY XENOXY-ALKYL AMINES

Francis N. Alquist and Harold R. Slagh, Midland, Mich., assignors to The Dow Chemical Company, Midland, Mich., a corporation of Michigan No Drawing. Application July 27, 1938, Serial No. 221,606

6 Claims. (Cl. 260—571)

This invention concerns a group of novel primary amines, a method for their preparation, and the hydrochlorides preparable therefrom. The new compounds falling within the scope of this invention have the formula R—O—R'—NH$_2$ wherein R represents a xenyl radical and R' represents a lower alkylene group, and the hydrochlorides thereof.

Our new primary amines are prepared by reacting a xenoxy-alkyl halide with an excess of liquid ammonia. The reaction is carried out by heating a mixture of the reactants in the liquid phase at temperatures preferably betweeen 125° C. and the decomposition temperature of the reaction mixture, although somewhat lower temperatures may be employed. The reaction pressure is autogenous. When the reaction is complete, the ammonia is distilled off and the reaction mixture diluted with water or aqueous alkali, and thereafter extracted with benzene. The benzene extract is dried and fractionally distilled to obtain the desired primary amine compound.

The hydrochlorides of these primary amine compounds may be readily prepared by dissolving the amine in a suitable organic solvent, e. g., benzene or petroleum ether, and thereafter bubbling dry hydrogen chloride through the solution to precipitate the desired amine salts. These hydrochlorides are generally solid, crystalline compounds and soluble in water.

The expressions "xenyl", "xenoxy", and "zenol", as herein employed, refer to diphenyl and phenylphenoxy radicals and to the phenylphenols, respectively, and include such radicals and compounds wherein the benzene nuclei may be substituted by alkyl or halogen.

The xenoxy-alkyl halides employed as reactants in the preparation of our new amine compounds may be prepared by the reaction of an alkylene dihalide with an alkali metal xenolate, e. g., sodium-ortho-phenyl phenolate. The xenoxy-alkyl halides are all high-boiling compounds and vary in characteristic from viscous oils to high-melting solids.

The following example is illustrative of one way in which our new method may be applied and of the compounds obtained thereby, but is not to be construed as limiting the invention:

Example 0.25 mol of beta-2-xenoxy-ethyl chloride and 5 mols of liquid ammonia were charged into a stainless steel bomb and heated with agitation at 150° C. for 3 hours. The bomb was then cooled to room temperature, the unreacted ammonia separated, and the reacted charge dispersed in an excess of water. The water dispersion was extracted with benzene, and the benzene extract dried and fractionally distilled, whereby there was obtained 0.125 mol of beta-2-xenoxy-ethyl amine as a colorless liquid boiling at 190° to 194° C. at 0.7 inch pressure, and having the specific gravity 1.106 at 25°/25° C. This compound has a characteristic amine odor and the formula

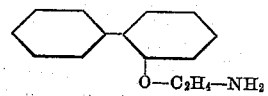

O—C$_2$H$_4$—NH$_2$

A portion of the beta-2-xenoxy-ethyl amine, as obtained above, was dissolved in benzene and dry hydrogen chloride bubbled through the solution to precipitate therefrom a solid hydrochloride salt. This precipitate was separated by filtration and dried to obtain beta-2-xenoxy-ethyl amine hydrochloride as white, shining crystals melting at 191° C. This compound is relatively water-soluble.

In a similar manner, other xenoxy-alkyl halides, such as the bromides and iodides, may be reacted with liquid ammonia to form primary amine compounds falling within the scope of this invention. Representative of the xenoxy-alkyl halides which may be so reacted are beta-2-xenoxy-ethyl bromide, a white, crystalline solid melting at 66.5° C. and boiling at 170° to 175° C. at 5 millimeters pressure; beta-4-xenoxy-ethyl chloride, a crystalline compound melting at 130° C. and boiling at 163°–165° C. at 3 millimeters pressure; (beta-methyl)-(gamma-2-xenoxy)-n-propyl chloride, an oil boiling at 170° to 173° C. at 5 millimeters pressure; beta-2-(5-chloro-xenoxy)-ethyl chloride, a viscous oil boiling at 149° to 150° C. at 3 millimeters pressure; beta-2-(5-isopropyl-xenoxy)-ethyl chloride, an oil boiling at 150° to 153° C. at 2 millimeters pressure, and having a specific gravity of 1.093 at 20° C., etc. Other similar compounds which may be employed are omega-2-xenoxy-n-amyl chloride, gamma-2-(5-bromo-xenoxy)-propyl bromide, beta-2-(5-tertiary-butyl-xenoxy)-ethyl chloride, beta-2-xenoxy-ethyl iodide, beta-4-(2,6-dimethyl-xenoxy)-ethyl chloride, and the like. The hydrochlorides of the primary amines obtained by the reaction of the above xenoxy-alkyl halides and ammonia may be readily prepared substantially as described in the foregoing example.

The amine compounds falling within the scope of the present invention are of value as corrosion inhibitors in acid solutions. For example, a 1 per cent solution of beta-2-xenoxy-ethyl amine in 10.09 per cent hydrochloric acid was prepared. Weighed iron strips of 6.75 square inches surface area were suspended in this solution and in a control solution of 10.09 per cent hydrochloric acid to determine the inhibiting effect of the amine. After 16 hours at room temperature the test specimens suspended in the control solution were found to have lost 0.798 and 0.727 gram in weight, respectively. Similar metallic strips suspended in the hydrochloric acid-amine solution showed a weight loss of only 0.037 and 0.047 gram, respectively, after 16 hours. The presence of the amine fraction in aqueous acid solution, therefore, accounted for a reduction in excess of 93 per cent of the total weight lost by corrosion.

We claim:

1. A compound selected from the group consisting of (1) primary amines having the formula R—O—R'—NH$_2$ wherein R represents a xenyl radical and R' represents a lower alkylene group, and (2) the hydrochlorides thereof.

2. A primary amine having the formula R—O—R'—NH$_2$ wherein R represents a xenyl radical and R' represents a lower alkylene group.

3. An amine hydrochloride having the formula (R—O—R'—NH$_2$)·HCl wherein R represents a xenyl radical and R' represents a lower alkylene group.

4. A primary amine having the formula

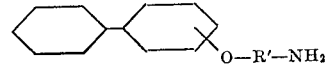

wherein R' represents a lower alkylene group.

5. Beta-2-xenoxy-ethyl amine having the formula

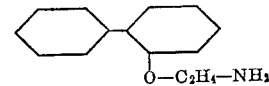

5. A method comprising the steps of reacting a xenoxy-alkyl halide with an excess of liquid ammonia at a temperature between about 125° C. and the decomposition temperature of the reaction mixture and under autogenous pressure, and thereafter separating from the reaction mixture a primary amine compound having the formula R—O—R'—NH$_2$ wherein R represents a xenyl radical and R' represents a lower alkylene group.

FRANCIS N. ALQUIST.
HAROLD R. SLAGH.